US000002030H

(19) United States

(12) Statutory Invention Registration

Hoxmeier

(10) Reg. No.: US H2030 H

(43) Published: Jun. 4, 2002

(54) PROCESS FOR THE PREPARATION OF RANDOM COPOLYMERS OF CONJUGATED DIENES AND VINYL AROMATIC COMPOUNDS

(75) Inventor: Ronald James Hoxmeier, Houston, TX (US)

(73) Assignee: Shell Oil Company, Houston, TX (US)

(21) Appl. No.: 08/084,685

(22) Filed: Jun. 29, 1993

(51) Int. Cl.[7] ..... C08F 4/46

(52) U.S. Cl. ..... 526/181

(58) Field of Search ..... 526/181

(56) References Cited

U.S. PATENT DOCUMENTS

| | | | | | |
|---|---|---|---|---|---|
| 3,301,840 | A | * | 1/1967 | Zelinski | 526/181 |
| 4,230,841 | A | * | 10/1980 | Prudence | 526/179 |
| 4,429,091 | A | * | 1/1984 | Hall | 526/181 |
| 4,696,986 | A | * | 9/1987 | Halasa | 526/181 |
| 5,194,535 | A | * | 3/1993 | Koppes | 526/181 |

FOREIGN PATENT DOCUMENTS

| | | | | |
|---|---|---|---|---|
| EP | 128607 | A | | 12/1984 |
| EP | 477512 | A | | 4/1992 |
| GB | 884490 | | * | 5/1959 |
| GB | 1283327 | | * | 7/1972 |

* cited by examiner

*Primary Examiner*—Charles T. Jordan
*Assistant Examiner*—Aleen J. Baker
(74) *Attorney, Agent, or Firm*—Donald F. Haas

(57) ABSTRACT

Random copolymers of a conjugated diene and at least 50% by weight of a vinyl aromatic compound are prepared by slowly reacting the monomers in a non-polar solvent in the presence of a chelating modifier such as ethylene glycol diethyl ether which results in at least 50% 1,2-polymerization of the conjugated diene.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR THE PREPARATION OF RANDOM COPOLYMERS OF CONJUGATED DIENES AND VINYL AROMATIC COMPOUNDS

FIELD OF THE INVENTION

The invention relates to solution polymerization of conjugated dienes and vinyl aromatic compounds. The invention further relates to random copolymers of the conjugated dienes and vinyl aromatic compounds in which more than 60% of the monomer units are arranged in an arbitrary manner.

BACKGROUND

Many processes for the preparation of substantially random copolymers of conjugated dienes and vinyl aromatic compounds are well known in the art. Typically, the solvents described for the known polymerization processes include essentially any aliphatic, cycloaliphatic or aromatic compound or a mixture of these compounds, provided that the compound is essentially inert. Cyclohexane alone or in combination with another compound is a highly preferred solvent in prior art processes.

Of all random polymerization processes, the one as disclosed in British patent specification No. 1,283,327, is particularly useful. First, a starting mixture is prepared from the solvent and part of the totally needed quantity of each of the monomers, subsequently the copolymerization is initiated by contacting this mixture with the initiator, and during copolymerization the monomer ratio in the reaction mixture is kept constant by addition of the remaining part of each of the monomers.

The random copolymerization processes referred to above are suitably carried out at temperatures in the range of from 50° C. Often compounds having a lower boiling point than cyclohexane, i.e. lower than 80° C., are added to the cyclohexane containing polymerization medium, in such concentrations that the solvency power is still sufficient, in order to provide enough vapor pressure to be able to remove the heat of polymerization by means of evaporative cooling.

SUMMARY

The invention is a process for preparing a random copolymer of a conjugated diene and at least 50% by weight of a vinyl aromatic compound in a non-polar solvent with the aid of a chelating modifier to achieve at least 50% 1,2-addition of the conjugated diene. The monomers are polymerized with a lithium initiator in the presence of a chelating modifier such as ethylene glycol diethyl ether. The reaction proceeds slowly with continuous addition of monomers at 10° C. to 40° C. to give random polymerization. Control of the polymerization reaction is enhanced by adding the chelating modifier after initial polymerization of at least 5% of the monomers.

DETAILED DESCRIPTION OF THE INVENTION

As a result of extensive research and experimentation a process has now been found in which the random polymerization of conjugated dienes and vinyl aromatic compounds is achieved in a non-polar solvent which contains a chelating modifier such as ethylene glycol diethyl ether to make random copolymers having at least 50% 1,2-addition of the conjugated diene. The random polymers have at least 50% by weight of the vinyl aromatic compound which is evenly distributed over most of the polymer molecule.

In the process according to the present invention polymerization rate constants for the monomers in the non-polar solvents containing the chelating modifiers are maintained significantly higher than the rate of adding monomers, which results in more random distribution of the 1,2 polymerized conjugated diene throughout the polymer molecules.

Since the polymerization process according to the present invention is carried out at low temperatures from 10° C. to 40° C., the danger of thermal decomposition of the living polymer chain end is low.

Chelating modifiers which will result in at least 50% 1,2-polymerization in non-polar solvents include ethylene glycol diethyl ether, propylene glycol diethyl ether, or tetramethyl-ethylenediamine, preferably ethylene glycol diethyl ether. The chelating modifier is present in the non-polar solvent, preferably cyclohexane, at a concentration from 500 ppm to 10,000 ppm, preferably 1,000 ppm to 4,000 ppm.

In order to control molecular weight of the random polymers, the totally needed quantity of initiator is added to a starting mixture of monomers under homogenization in a comparatively short time. The amount of monomers contained in the starting mixture is from 1% to 10% by weight of the total amount of monomers to be reacted. The chelating modifier is added after formation of small living polymers since earlier combination of the chelating modifier and the initiator results in an uncontrolled reaction between the chelating modifier and the initiator. The loss of significant amounts of the initiator results in an uncontrolled increase in molecular weight and the loss of significant amounts of the chelating modifier results in an uncontrolled reduction in 1,2 addition.

The copolymerization reaction is preferably terminated by means of substances which kill the living polymer; this can be a proton releasing compound, for instance water, an alcohol, an amine or protonic acid, a coupling agent, or a functionalizing agent such as carbon dioxide or ethylene oxide.

The aromatic vinyl compound is preferably styrene, but may consist of another mono-vinyl aromatic compound for example: 1-vinylnaphthalene, 3,5-diethylstyrene, 4-n-propylstyrene, 2,4,6-trimethylstyrene, 4-phenylstyrene, 4-methylstyrene, 3,5-diphenylstyrene, 3-ethyl-1-vinylnaphthalene 8-phenyl-1-vinylnaphthalene or a mixture thereof or mixtures containing predominantly styrene.

The conjugated diene is one capable of copolymerization with styrene or another aromatic vinyl compound and such that when polymerized with styrene or another selected aromatic vinyl compound or compounds, it provides a polymer having the desired properties. The diene is preferably 1,3-butadiene, but may be another diene, for example, 1,3-pentadiene, 2-methyl-1,3-butadiene (isoprene), 2,3-dimethyl-1,3-butadiene, 2-methyl-1,3-pentadiene or 2,3-dimethyl-1,3-pentadiene or mixtures of them alone or with butadiene.

After polymerization of the starting mixture, monomer addition preferably occurs by continuous addition of a premixed batch of the monomers to achieve the best distribution of the monomers. Although not preferred, periodic addition of separate portions of each monomer can be controlled to give good distribution of the monomers. As a result of the steps mentioned, the monomer concentration in the reactor is kept substantially constant which facilitates the control of the process.

Also special preference is given to the addition of the monomers during the copolymerization at a rate less than the rate at which the concerning monomer is consumed. Under these conditions the relative rate at which both monomers are applied during the copolymerization can be kept substantially constant at a value calculated beforehand and the heat development can be calculated in advance to control the temperature of the polymerization.

The lithium initiator is an alkyllithium compound, such as methylenedilithium, isopropyllithium, n-butyllithium, sec-butyllithium, amyllithium, 2-ethylhexyllithium, phenyllithium, ethylenedilithium, trimethylenedilithium, pentamethylenedilithium, 1,4-dilithiobenzene, 1,5-dilithiobenzene, 1,5-dilithionaphthalene and 1,3,5-trilithiumpentane. The amount of initiator used in the process according to the present invention may vary within the wide limits to control molecular weight of the random copolymers.

Generally at the end of the reaction the copolymer containing the reaction mixture is pumped to a polymer recovery area. The principal step in recovery of the polymer comprises coagulation and eventual drying of the polymer to produce a crumb. Thus the cement may be coagulated by treatment with steam and/or hot water. Alternatively, the cement may be sprayed into a hot water bath under such conditions that a crumb is formed. The solvent is removed as a vapor and may be recovered and recycled as desired. The resulting copolymer-water slurry is withdrawn and passed on to a dewatering screen where the water passes through the screen leaving the rubber crumb. This may be reslurried with cold water, drained and finally dried by known means.

The random copolymers are useful within a peak molecular weight range from 5,000 to 250,000, preferably from 25,000 to 50,000. The random copolymers of the invention can be used as a replacement for styrene-butadiene rubbers (SBR's) in general, and are most useful in toner compositions for copy machines as taught in EP 477,577.

DETAILED DESCRIPTION OF PREFERRED EMBODIMENTS

The process of the invention is preferably the random polymerization of styrene and 1,3-butadiene in cyclohexane which contains ethylene glycol diethyl ether to make random copolymers having at least 70% by weight of the styrene and at least 70% 1,2-addition of the butadiene which are evenly distributed over most of the polymer molecule.

It is preferred that throughout the process the reaction mixture is intensively homogenized by means of an intensively working stirrer.

The following examples and comparative examples are presented to further illustrate the invention which is defined by the claims.

EXAMPLE 1

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. The reactor was charged with 375 lbs of the cyclohexane, 273 ml of propylene glycol diethyl ether (sufficient to give 1000 ppm by weight), and 1.7 moles of 1.4 M s-buLi initiator in cyclohexane solvent. In a separate vessel, 94 lbs of styrene and 31 lbs of butadiene were charged and premixed.

The polymerization was completed isothermally at 35° C. by adding the premixed monomer solution over a 60 minute period at a constant feed rate of 2 lbs/min. The composition of the polymer chains was measured every 5 to 10 minutes during addition of the monomers. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 40,300 vs. an expected peak MW of 33,000. The 1,2-addition of the butadiene was 66.1% which varied from 65.5% to 67.4% during polymerization. The styrene content was 75.6% by weight which varied from 73% to 75.6% during polymerization.

EXAMPLE 2

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. The reactor was charged with 375 lbs of the cyclohexane, 1000 ppm by weight of the reaction mixture of ethylene glycol diethyl ether, and 1.9 moles of 1.4 M s-buLi initiator in cyclohexane solvent. In a separate vessel, 97.5 lbs of styrene and 27.4 lbs of butadiene were charged and premixed.

The polymerization was completed isothermally at 20° C. by adding the premixed monomer solution over a 120 minute period at a constant feed rate of 1 lb/min. The composition of the polymer chains was measured every 15 minutes during addition of the monomers. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 41,800 vs. an expected peak MW of 30,000. The 1,2-addition of the butadiene was 76%. The styrene content was 78% by weight which did not vary during polymerization.

EXAMPLE 3

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. The reactor was charged with 375 lbs of the cyclohexane, 2000 ppm by weight of the reaction mixture of ethylene glycol diethyl ether, and 3.1 moles of 1.4 M s-buLi initiator in cyclohexane solvent. In a separate vessel, 97.5 lbs of styrene and 27.4 lbs of butadiene were charged and premixed.

The polymerization was completed isothermally at 15° C. by adding the premixed monomer solution over a 180 minute period at a constant feed rate of 0.7 lb/min. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 90,500 vs. an expected peak MW of 18,300 as a result of a reaction between the ethylene glycol diethyl ether and the s-buLi. The 1,2-addition of the butadiene was 80.1%. The styrene content was 78.8% by weight.

EXAMPLE 4

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. The reactor was charged with 375 lbs of the cyclohexane, 2000 ppm by weight of the reaction mixture of tetramethylethylenediamine (TMEDA), and 3.1 moles of 1.4 M s-buLi initiator in cyclohexane solvent. In a separate vessel, 97.5 lbs of styrene and 27.4 lbs of butadiene were charged and premixed.

The polymerization was completed isothermally at 15° C. by adding the premixed monomer solution over a 240 minute period at a constant feed rate of 0.5 lb/min. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 22,000 vs. an expected peak MW of 18,300 as a result of low reaction between the TMEDA and the s-buLi. However, the 1,2-addition of the butadiene was only 57%. The styrene content was 79% by weight.

EXAMPLE 5

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. In a separate vessel, 97.5 lbs of styrene and 27.4 lbs of butadiene were charged and premixed. The reactor was then charged with 375 lbs of the cyclohexane, 10 lbs of the mixed monomers, and 2.1 moles of 1.4 M s-buLi initiator in cyclohexane solvent.

The polymerization proceeded for 10 minutes at 15° C. before addition of 4000 ppm by weight of the reaction mixture of ethylene glycol diethyl ether. Polymerization was completed isothermally at 20° C. by adding the premixed monomer solution over a 150 minute period at a constant feed rate of 0.75 lb/min. The composition of the polymer chains was measured every 30 minutes during addition of the monomers. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 35,300 vs. an expected peak MW of 27,000. The 1,2-addition of the butadiene was 79.6%. The styrene content was 79.1% by weight.

EXAMPLE 6

Styrene and 1,3-butadiene were copolymerized by means of sec-butyllithium (s-buLi) as the initiator in cyclohexane. The copolymerization was carried out in a reactor of 100 gallons capacity, which was provided with a vigorous stirrer. In a separate vessel, 97.5 lbs of styrene and 27.4 lbs of butadiene were charged and premixed. The reactor was then charged with 375 lbs of the cyclohexane, 10 lbs of the mixed monomers, and 3.1 moles of 1.4 M s-buLi initiator in cyclohexane solvent.

The polymerization proceeded for 10 minutes at 15° C. before addition of 4000 ppm by weight of the reaction mixture of ethylene glycol diethyl ether. Polymerization was completed isothermally at 20° C. by adding the premixed monomer solution over a 150 minute period at a constant feed rate of 0.75 lb/min. Polymerization continued eight additional half lives after the last addition of monomers. Polymerization was then terminated by addition of methanol, and the polymer was recovered by steam coagulation. The recovered polymer was ground to give a white granular powder followed by drying at 35° C. for 24 hours.

The random copolymer was determined by GPC analysis to have a peak MW of 24,100 vs. an expected peak MW of 18,300. The 1,2-addition of. the butadiene was 79%. The styrene content was 80.3% by weight.

Examples 5 and 6 establish a dramatic improvement in control of molecular weight for high 1,2-addition random copolymers resulting from conversion of s-buLi to small living polymer molecules prior to addition of the glycol ether in comparison to Example 3.

What is claimed is:

1. An improved process for the preparation of a random copolymer of at least one conjugated diene and at least 50% by weight of a vinyl aromatic compound wherein the monomers are polymerized with a lithium initiator, the improvement comprising polymerizing at least 5% by weight of the monomers in a non-polar solvent prior to addition of a sufficient amount tetramethylethylenediamine to achieve 1,2-addition of at least 60%, and them slowly adding the remaining portion of the monomers to maintain a reaction temperature from 10° C. to 40° C.

2. The process of claim 1 wherein the conjugated diene is 1,3-butadiene and the vinyl aromatic compound is styrene.

3. The process of claim 2 wherein the monomers are premixed and the mixture of the monomers comprises at least 70 percent by weight of the styrene.

* * * * *